US010368321B1

United States Patent
Sitaram et al.

(10) Patent No.: US 10,368,321 B1
(45) Date of Patent: Jul. 30, 2019

(54) MINIMIZING INTERFERENCE CAUSED BY HIGH-POWERED UPLINK TRANSMISSIONS

(71) Applicant: Sprint Spectrum LP, Overland Park, KS (US)

(72) Inventors: Krishna Sitaram, Chantilly, VA (US); Chunmei Liu, Great Falls, VA (US); Hemanth Pawar, Brambleton, VA (US); Pratik Kothari, Maharashtra (IN)

(73) Assignee: Sprint Spectrum L.P., Overland Park, KS (US)

( * ) Notice: Subject to any disclaimer, the term of this patent is extended or adjusted under 35 U.S.C. 154(b) by 9 days.

(21) Appl. No.: 15/605,015

(22) Filed: May 25, 2017

(51) Int. Cl.
*H04B 7/024* (2017.01)
*H04B 17/18* (2015.01)
(Continued)

(52) U.S. Cl.
CPC .......... *H04W 52/343* (2013.01); *H04B 7/024* (2013.01); *H04B 17/18* (2015.01); *H04L 5/0035* (2013.01); *H04L 5/0089* (2013.01); *H04W 8/245* (2013.01); *H04W 24/02* (2013.01); *H04W 28/0221* (2013.01); *H04W 28/0247* (2013.01); *H04W 28/0284* (2013.01); *H04W 28/0289* (2013.01); *H04W 48/10* (2013.01); *H04W 52/146* (2013.01); *H04W 52/243* (2013.01); *H04W 52/246* (2013.01); *H04W 52/247* (2013.01); *H04W 52/248* (2013.01); *H04W 52/346* (2013.01); *H04W 52/386* (2013.01); *H04W 72/048* (2013.01); *H04W 72/0473* (2013.01); *H04W 72/0486* (2013.01)

(58) Field of Classification Search
CPC ..... H04W 4/90; H04W 52/146; H04W 52/18; H04W 52/241; H04W 52/242; H04W 52/243; H04W 52/281; H04W 52/34; H04W 52/367; H04W 76/50; H04W 8/22–245; H04W 24/02; H04W 28/02–0247; H04W 28/0284–0289; H04W 48/02–12; H04W 54/14; H04W 52/24; H04W 52/244; H04W 52/246; H04W 52/247; H04W 52/248; H04W 52/343; H04W 52/346; H04W 52/36; H04W 52/365; H04W 52/38; H04W 52/386; H04W 72/0473–0486; H04L 6/0036; H04L 5/003–0035; H04L 5/0078–0089; H04B 7/02–024; H04B 17/0082–19; H04B 17/30–40; H04J 11/0023–0066
See application file for complete search history.

(56) References Cited

U.S. PATENT DOCUMENTS 9,078,220 B2   7/2015  Makhlouf et al.
9,264,192 B2 * 2/2016  Park ..................... H04L 5/0035
                                                      370/332

(Continued)

*Primary Examiner* — Timothy J Weidner

(57) ABSTRACT

Systems, methods, and processing nodes for minimizing interference caused by high-powered wireless devices to other wireless devices in the network by determining an increase in a number of high-powered wireless devices attached to a serving access node causing a corresponding increase in a potential interference to standard-powered wireless devices attached to the serving access node. In response to determining this increase, the methods include activating a coordinated transmission mode for one or more standard-powered wireless devices.

20 Claims, 7 Drawing Sheets

(51) Int. Cl.
  *H04L 5/00* (2006.01)
  *H04W 8/24* (2009.01)
  *H04W 24/02* (2009.01)
  *H04W 28/02* (2009.01)
  *H04W 48/10* (2009.01)
  *H04W 52/14* (2009.01)
  *H04W 52/24* (2009.01)
  *H04W 52/34* (2009.01)
  *H04W 52/38* (2009.01)
  *H04W 72/04* (2009.01)

(56) References Cited

U.S. PATENT DOCUMENTS

| | | | | |
|---|---|---|---|---|
| 10,231,188 B1* | 3/2019 | Singh | H04W 52/146 | 455/522 |
| 2012/0184322 A1* | 7/2012 | Falconetti | H04W 28/18 | 455/524 |
| 2013/0258976 A1* | 10/2013 | Nagata | H04W 24/10 | 370/329 |
| 2013/0343261 A1* | 12/2013 | Gonsa | H04B 7/2606 | 370/315 |
| 2014/0011531 A1* | 1/2014 | Burstrom | H04L 5/0035 | 455/509 |
| 2015/0111608 A1* | 4/2015 | Kazmi | H04W 52/281 | 455/522 |
| 2017/0063435 A1* | 3/2017 | Christensson | H04B 7/024 | 370/232 |

* cited by examiner

MINIMIZING INTERFERENCE CAUSED BY HIGH-POWERED UPLINK TRANSMISSIONS

TECHNICAL BACKGROUND

As wireless networks evolve and grow in complexity, there are ongoing challenges associated with reaching targeted coverage levels. Recently, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed low power wireless devices. As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | +2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other low-power wireless devices are currently defined in LTE as power class 3 and/or power class 4 wireless devices. Power class 3 and/or power class 4 low-power wireless devices can be configured with a maximum allowable transmit power level of +23 dBm for frequency bands I-III with a nominal power tolerance of ±2 dB (e.g., for E-UTRA bands). High-power class wireless devices are currently defined as power class 1 or power class 2 wireless devices. Power class 1 and/or power class 2 high-power class wireless devices can be configured with a maximum allowable transmit power level of +26 dBm for frequency bands I-II with a nominal power tolerance ±2 dB (e.g., for E-UTRA bands), as illustrated in Table 1.

Because high-power class wireless devices are capable of transmitting at a maximum allowable transmit power that is higher than lower-power class wireless devices, there are potential uplink (UL) interference concerns when high-power class wireless devices are deployed in areas having an access node density designed for low-power wireless devices. Namely, power mismatches between high-power class wireless devices and low-power wireless devices may degrade UL system performance. For example, while deployment of high-power class wireless devices within a radio range of ANs designed for low-power wireless devices enhances throughput of high-power class wireless devices, it degrades the UL link budget for low-power wireless devices operating within the same radio range due, in part, to overlooked power differences between high-power class wireless devices and the low-power wireless devices.

OVERVIEW

Exemplary embodiments described herein include systems, methods, and processing nodes for minimizing interference that may potentially be caused by high-powered wireless devices to other wireless devices in the network. Exemplary methods for minimizing interference in a wireless network include determining an increase in a number of high-powered wireless devices attached to a serving access node. The increase in the number of high-powered wireless devices causes a corresponding increase in a potential interference to standard-powered wireless devices attached to the serving access node. In response to determining this increase, the methods include activating a coordinated transmission mode for one or more standard-powered wireless devices.

Exemplary systems for minimizing interference in a wireless network includes a processing node and a processor coupled to the processing node. The processor configures the processing node to perform operations including identifying a plurality of high-powered wireless devices and a plurality of standard-powered wireless devices attached to a serving access node. Uplink transmissions from the plurality of high-powered wireless devices cause a potential interference to one or more of the plurality of standard-powered wireless devices. The operations include determining that the potential interference meets a threshold potential interference, and deactivating a high-powered transmission mode for one or more of the plurality of high-powered wireless devices.

Exemplary processing nodes for minimizing interference in a wireless network are configured to perform operations including monitoring a congestion level of a communication link between a serving access node and a neighboring access node. The congestion level is based on a number of wireless devices configured to utilize a coordinated transmission mode, which enables each wireless device to transmit uplink data via a combination of the serving access node and the neighboring access node. The method includes adjusting the number of wireless devices configured to utilize the coordinated transmission mode to maintain the congestion level to within a threshold congestion level.

DETAILED DESCRIPTION

Figure 1:
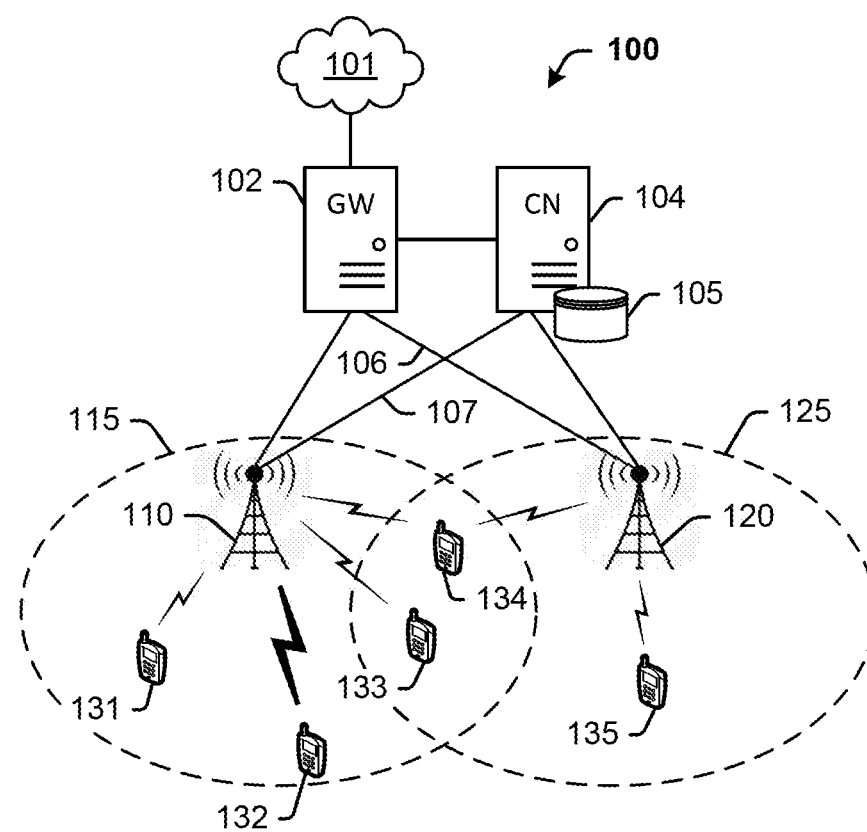
FIG. 1 depicts an exemplary system for minimizing interference in a wireless network.

Exemplary embodiments herein disclose methods, systems, and processing nodes for minimizing interference that is caused to wireless devices in a network by high-powered wireless devices. The interference may be due to uplink transmissions from wireless devices that are configured to operate in a high-powered transmission mode (i.e. high-powered wireless devices). For example, these wireless devices may be assigned a higher power class, which provides a greater power headroom for uplink transmissions than other wireless devices that are assigned a lower power class, which provides a lower or default power headroom for uplink transmissions. Generally, high-powered wireless devices are not subjected to interference from other high-powered wireless devices, but any other device using a standard or "default" transmission power, or a lower transmission power (i.e. standard-powered wireless devices), can be subject to interference. Further, transmissions from the standard-powered wireless devices (uplink transmissions) as well as transmissions from other network nodes received at the standard-powered wireless devices (downlink transmissions) may each be subject to interference from the high-powered wireless devices. This is especially true when both high-powered and standard-powered wireless devices are operating on the same frequency band or sub-band. Moreover, the interference is not necessarily an actual or measured interference, but may be a potential for interference based on a number of wireless devices operating in the high-powered operating mode (i.e., a "potential interference").

Thus, operations described herein include monitoring the number of wireless devices that are operating in the high-powered transmission mode, and associating an increase in the number of high-powered wireless devices with an increase in the potential interference. The monitoring may be performed for high-powered wireless devices that are attached to a particular access node, i.e. a serving access node. Further, monitoring may be enabled by first identifying a plurality of high-powered wireless devices and a plurality of standard-powered wireless devices attached to the serving access node, or one or more neighboring access nodes.

In response to determining an increase in the number of high-powered wireless devices, a coordinated transmission mode may be activated for one or more of the standard-powered wireless devices attached to the serving access node. The coordinated transmission mode enables the one or more standard-powered wireless devices to transmit uplink data via a combination of a serving access node and one or more neighboring access nodes. For example, the coordinate transmission mode may comprise a coordinated multipoint (CoMP) transmission mode. Prior to enabling the coordinated transmission mode, the one or more standard-powered wireless devices may be determined to be within a signaling range of the serving access node and the one or more neighboring access nodes. For example, only those standard-powered wireless devices that are located an overlapping coverage area shared by the serving access node and at least one neighboring access node may be activated with the coordinated transmission mode.

In further embodiments, operations described herein include determining and/or monitoring a congestion level of access nodes in the wireless network. For example, the coordinated transmission mode results in increased signaling between access nodes receiving the uplink transmissions from the standard-powered wireless devices. The signaling may be performed using a communication link between the access nodes such as, for instance, an X2 link. Increased signaling can result in increased traffic on the X2 link, and can further be indicative of a congestion or potential for congestion. Further, the congestion level may be based on a number of wireless devices configured to utilize the coordinated transmission mode. Therefore, congestion may be mitigated by adjusting the number of standard-powered wireless devices that utilize the coordinated transmission mode. For example dynamic adjustment of the number of wireless devices configured to utilize the coordinated transmission mode can include determining that the congestion level meets the threshold congestion level, and deactivating the coordinated transmission mode for one or more of the number of wireless devices until the congestion level is within the threshold congestion level. Further, it may be determined that the congestion level is within the threshold congestion level, and the coordinated transmission mode may be activated for one or more of the number of wireless devices until the congestion level meets the threshold congestion level. In other words, the coordinated transmission mode may be incrementally activated or deactivated for each standard-powered wireless device, to maintain the congestion level to within a threshold congestion level. A maximum number of standard-powered wireless devices activated with the coordinated transmission mode may be based on a combination of the congestion and the number of standard-powered wireless devices that are located within range of access nodes capable of coordinating uplink transmissions.

In further embodiments, the operations described herein include determining and/or monitoring the potential interference level, determining that the potential interference level exceeds a threshold interference level, and deactivating the high-powered transmission mode for one or more of the high-powered wireless devices. The determination that the potential interference level exceeds a threshold interference level can be based on the number of high-powered wireless devices exceeding a threshold number of high-powered wireless devices. Deactivating the high-powered transmission mode for the high-powered wireless devices may be performed separately or in conjunction with the activation of the coordinated transmission mode for the standard-powered wireless devices. For example, if the potential interference level continues to rise after a maximum number of standard-powered wireless devices is activated with the coordinated transmission mode, then the high-powered transmission mode is deactivated for one or more of the high-powered wireless devices.

Deactivating the high-powered transmission mode can include deactivating the high-powered transmission mode for all high-powered wireless devices attached to the serving access node. This may be performed by broadcasting a reduced maximum power from the serving access node. For example, a system information message indicating a reduced maximum power level (such as a default maximum power level) may be broadcast from the serving access node to all wireless devices attached thereto, resulting in high-powered wireless devices having to lower their transmission power level to the default maximum power level. Further, upon determining that the potential interference stops exceeding the threshold interference, the high-powered transmission mode may be activated for one or more of the high-powered wireless devices. In exemplary embodiments, the high-powered transmission mode may be the default transmission mode for the high-powered wireless devices, while the standard or low-powered transmission mode may be the default transmission mode for standard or low-powered wireless devices.

In other embodiments, these operations may be performed for a system comprising a plurality of access nodes. In other words, numbers may be monitored for wireless devices operating in high-powered transmission mode and attached to each of two or more neighboring access nodes, and a coordinated transmission mode activated for one or more standard-powered wireless devices that are attached to any of these two or more neighboring access nodes. This is based on the potential for interference that may be caused to wireless devices attached to neighboring access node that may be utilizing a common frequency band or sub-band. In such embodiments, each of the two or more neighboring access nodes may monitor the number of wireless devices attached thereto, and communicate this information in real-time to the other access nodes via a communication link such as, for instance, an X2 link. Alternatively or in addition, a processing node (such as, for instance, a controller node) communicatively coupled to each of the two or more neighboring access may be utilized to monitor the high-powered wireless devices connected thereto, determine potential interference therefrom, and instruct the access nodes to perform the interference minimization operations further described below with respect to the embodiments depicted in FIGS. 1-7.

FIG. 1 depicts an exemplary system 100 for selecting a frame configuration in a wireless network. System 100 comprises a communication network 101, gateway 102, controller node 104, access nodes 110 and 120, and end-user wireless devices 131, 132, 133, 134, 135, and 136. Access node 110 is illustrated as having a coverage area 115 and access node 120 is illustrate as having a coverage area 125. Wireless devices 131, 132, 133, and 134 are illustrated as being located within coverage area 115 and accessing network services from access node 110. For example, wireless devices 131, 132, 133, 134 may communicate with access node 110 using a wireless transmission path such as LTE. Further, wireless devices 133 and 134 are depicted as being within both coverage areas 115 and 125, and wireless device 135 is illustrated as being within coverage area 125, and accessing network services from access node 120 via a standard transmission path. Further, at least wireless device 132 may be capable of operating in a high-powered transmission mode. As described herein (and further with respect to FIG. 3), such wireless devices are able to communicate with access nodes over longer distances than standard wireless devices. In other words, an effective coverage area of an access node may be increased to effectively reach wireless devices at a cell edge. As such, wireless device 132 may be assigned a transmit power class that allows a higher transmit power than other wireless devices. For example, wireless device 132 is located at a cell edge of coverage area 115, and therefore enables a high-powered transmission mode for uplink transmission. In addition, at least wireless device 134 may be capable of simultaneously communicating with access nodes 110 and 120 using a coordinated transmission mode such as, for instance, coordinated multipoint (CoMP). It should be noted that although only access nodes 110, 120 and wireless devices 131-135 are shown in FIG. 1, any number and combination of access nodes and wireless devices is possible within system 100, without any material difference to the operations described herein.

In operation, interference that may be caused by wireless device 132 to other wireless devices (i.e. potential interference) is minimized by incrementally configuring one or more of wireless devices 131-135 to operate using the coordinated transmission mode, and/or disabling the high-powered transmission mode upon the potential interference exceeding a threshold. For example, it will be appreciated by those having ordinary skill in the art that high-powered transmissions from wireless device 132 can cause interference to wireless devices 131, 133, 134, 135 that are operating using a standard transmission power for uplink transmissions, particularly when each of wireless devices 131-135 utilize the same frequency band or sub-band. Such minimization of interference may include monitoring the number of wireless devices that are operating in the high-powered transmission mode, determining an increase in the number of high-powered wireless devices, and activating a coordinated transmission mode for one or more standard-powered wireless devices. For example, upon determining that wireless device 132 is operating in a high-powered transmission mode, wireless device 134 may be configured to operate in the coordinated transmission mode. The coordinated transmission mode enables wireless device 134 to transmit uplink data via a combination of access node 110 and neighboring access node 120.

Prior to enabling the coordinated transmission mode for wireless device 134, wireless device 134 may be determined to be within a signaling range of both access nodes 110 and 120. In other words, only those standard-powered wireless devices that are located in the overlap region of coverage areas 115 and 125 may be activated with the coordinated transmission mode. Further, if additional wireless devices such as wireless device 131 is determined to be utilizing the high-powered transmission mode, then wireless device 133 may be configured to operate in the coordinated transmission mode, since wireless device 133 is within both coverage areas 115 and 125. Such an increase in the number of wireless devices operating in the coordinated transmission mode may be monitored, and associated with a congestion level of transmissions between access nodes 110, 120 caused by increased signaling between access nodes 110, 120 coordinating the uplink transmissions. Dynamic adjustment of the number of wireless devices configured to utilize the coordinated transmission mode can be performed by incrementally activating or deactivating the coordinated transmission mode for each standard-powered wireless device to maintain the congestion level to within a threshold congestion level.

Further, if the potential interference level (caused by, for instance, one or both of wireless devices 131, 132 operating in the high-powered transmission mode) exceeds a threshold interference level, then the high-powered transmission mode may be deactivated. For example, if the potential interference level continues to rise after a threshold number of standard-powered wireless devices is activated with the coordinated transmission mode, then the high-powered transmission mode is deactivated for one or more of the high-powered wireless devices. Disabling and enabling the high-power transmission mode may include changing a power class of wireless devices 131, 132, 135. For example, whereas standard wireless devices are allowed a maximum uplink transmit power as specified by a network operator, wireless devices capable of transmitting at a higher uplink transmit power may be provided with a higher maximum uplink transmit power. Such variations in power may be defined using one of four power classes further described below. Changing the power class can include setting a maximum uplink transmission power value allowed by a serving access node to be equal to a standard maximum uplink transmission power value, and broadcasting the maximum uplink transmission power value to each wireless device.

Further, wireless device 135 may also be monitored for whether or not it is operating in the high-powered transmission mode, and the coordinated transmission mode activated accordingly for one or both of wireless devices 134, 133. This is based on the potential for interference that may be caused to wireless devices 134, 133 from the uplink transmissions of wireless device 135. In such embodiments, each of access nodes 110, 120 may monitor the number of wireless devices attached thereto, and communicate this information in real-time to the other access nodes via a communication link such as, for instance, an X2 link (not shown). Alternatively or in addition, a processing node (such as, for instance, controller node 104) may be utilized to monitor the numbers of wireless devices utilizing both high-powered and coordinated transmission modes, determine potential interference, and instruct access nodes 110, 120 to perform the interference minimization operations further described herein.

Access nodes 110, 120 can be any network node configured to provide communication between wireless devices 131-135 and communication network 101, including standard access nodes and/or short range, low power, small access nodes. For instance, access nodes 110, 120 may include any standard access node, such as a macro-cell access node, base transceiver station, a radio base station, an eNodeB device, an enhanced eNodeB device, or the like. In an exemplary embodiment, a macro-cell access node can have a coverage area 115, 125 in the range of approximately five kilometers to thirty-five kilometers and an output power in the tens of watts. In an embodiment, access nodes 110, 120 can be small-cell access nodes including a microcell access node, a picocell access node, a femtocell access node, or the like such as a home NodeB or a home eNodeB device.

Figure 2:
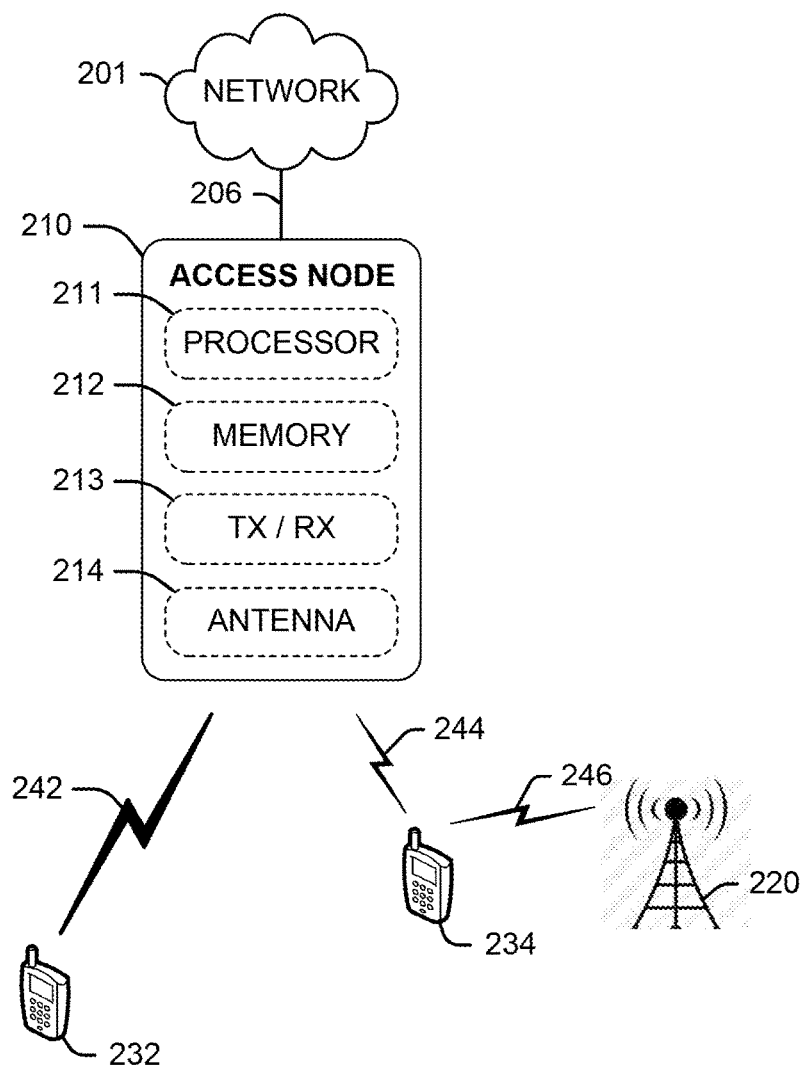
FIG. 2 depicts an exemplary access node for minimizing interference in a wireless network.

Access nodes 110, 120 can comprise a processor and associated circuitry to execute or direct the execution of computer-readable instructions to perform operations such as those further described in FIG. 2. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can each receive instructions and other input at a user interface. Access nodes 110, 120 communicates with gateway node 102 and controller node 104 via communication links 106, 107. Access nodes 110, 120 may communicate with other access nodes (not shown) using a direct link such as an X2 link or similar.

Wireless devices 131-135 may be any device, system, combination of devices, or other such communication platform capable of communicating wirelessly with access nodes 110, 120 using one or more frequency bands deployed therefrom. Each of wireless devices 131-135 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible. Components of exemplary wireless device and transmission power capabilities thereof are further described with reference to FIG. 3.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-135. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as locations, power class assignments, and transmission mode capabilities of wireless devices 131-135, presence and transmit power allowances of access nodes 110, 120, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

FIG. 2 depicts an exemplary access node 210 for minimizing interference. Access node 210 may comprise, for example, a macro-cell or a small-cell access node, such as one of access nodes 110 described with reference to FIG. 1. Access node 210 provides wireless devices 232, 234 with access to network services and applications on network 201. Access node 210 is illustrated as comprising a processor 211, memory 212, transceiver 213, and antenna 214. Processor 211 executes instructions stored on memory 212, while transceiver 213 and antenna 214 enable communication with wireless devices 232, 234 over communication links 242, 244, respectively. Instructions stored on memory 212 can include instructions for determining a potential interference caused by high-powered transmissions over communication link 242 to standard or low-powered transmissions over communication link 244, and accordingly deactivate the high-powered transmission mode for wireless device 232 and/or activate a coordinated transmission mode for wireless device 234, as further described herein. Further, instructions stored on memory 212 can include instructions for processing coordinated transmissions 244, 246 via a communication link (not shown) with access node 220 using, for example, CoMP.

Figure 3:
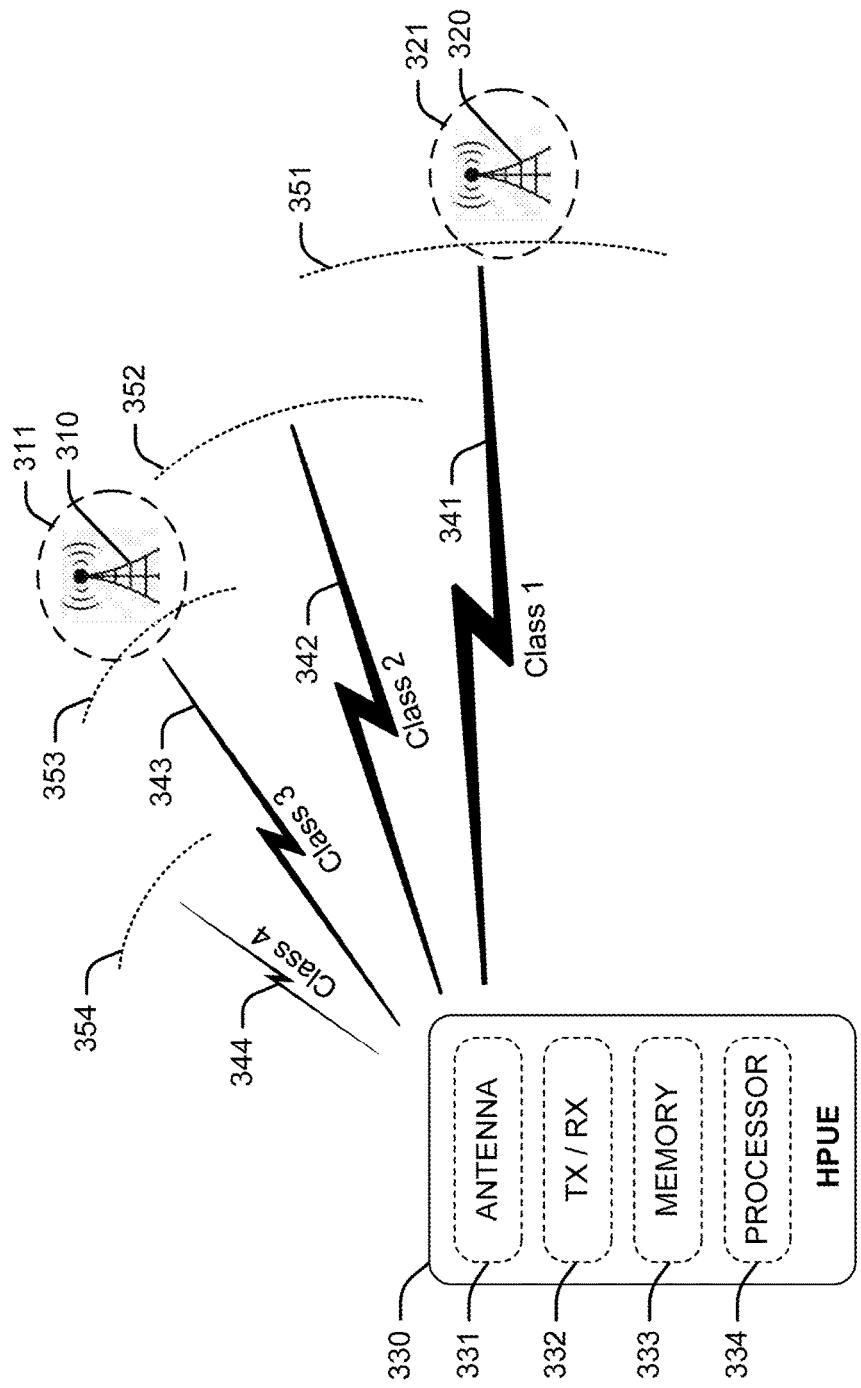
FIG. 3 depicts an exemplary wireless device capable of transmission in several power classes.

FIG. 3 depicts an exemplary wireless device 330 capable of transmission in several power classes. As noted above, wireless devices can be configured as different power class wireless devices (e.g., high-power wireless devices and/or standard-power wireless devices as well as low-power wireless devices). Wireless device 330 is therefore equipped with an appropriate antenna 331 and transceiver 332 enabling increased transmit power from wireless device 330 to one or more access node 310, 320. For example, wireless device 330 is capable of operating in a transmission mode utilizing power class 1, to transmit an uplink transmission 341 at a range 351. Wireless device 330 may further switch transmission modes to utilizing power class 2 to transmit uplink transmission 342 at a range 352, utilizing power class 3 to transmit uplink transmission 343 at a range 353, and utilizing power class 4 to transmit uplink transmission 344 at a range 354. Antenna 331 and transceiver 332 are appropriately configured to utilize these differently-powered transmission modes.

Further, an effective coverage area of an access node can be limited by an amount of power available to a wireless device, enabling wireless devices capable of utilizing high-power transmission modes to communicate with access nodes from a longer distance than standard-power wireless devices. In this embodiment, coverage areas 311, 321 of access nodes 310, 320 (as also depicted in FIG. 1) can vary based on the transmission mode being utilized by wireless device 330. In other words, effective coverage areas 351-354 can change dynamically based on a transmit power level of uplink transmissions 341, 342, 343, 344. Consequently, real-time adjustment of the power classes of wireless devices can be performed by network operators to increase the effective coverage area of their access nodes, enabling more consumers will to use a given access node. For example, to enable communication with access node 320 from a long distance (such as an edge of a coverage area), wireless device 330 may be configured to transmit uplink transmissions 341 utilizing a high-power transmission mode such as power class 1. Alternatively, to enable communication with access node 310 from a short distance, wireless device 330 may be configured to transmit uplink transmissions 341 utilizing a standard-power transmission mode such as power class 3. Moreover, controlling the transmit power level or changing the power class of wireless devices can be performed by setting a maximum uplink transmission power value allowed by the serving access node to be equal to a standard maximum uplink transmission power value, and broadcasting the maximum uplink transmission power value to the wireless device via, for example, a system information message.

Figure 4:
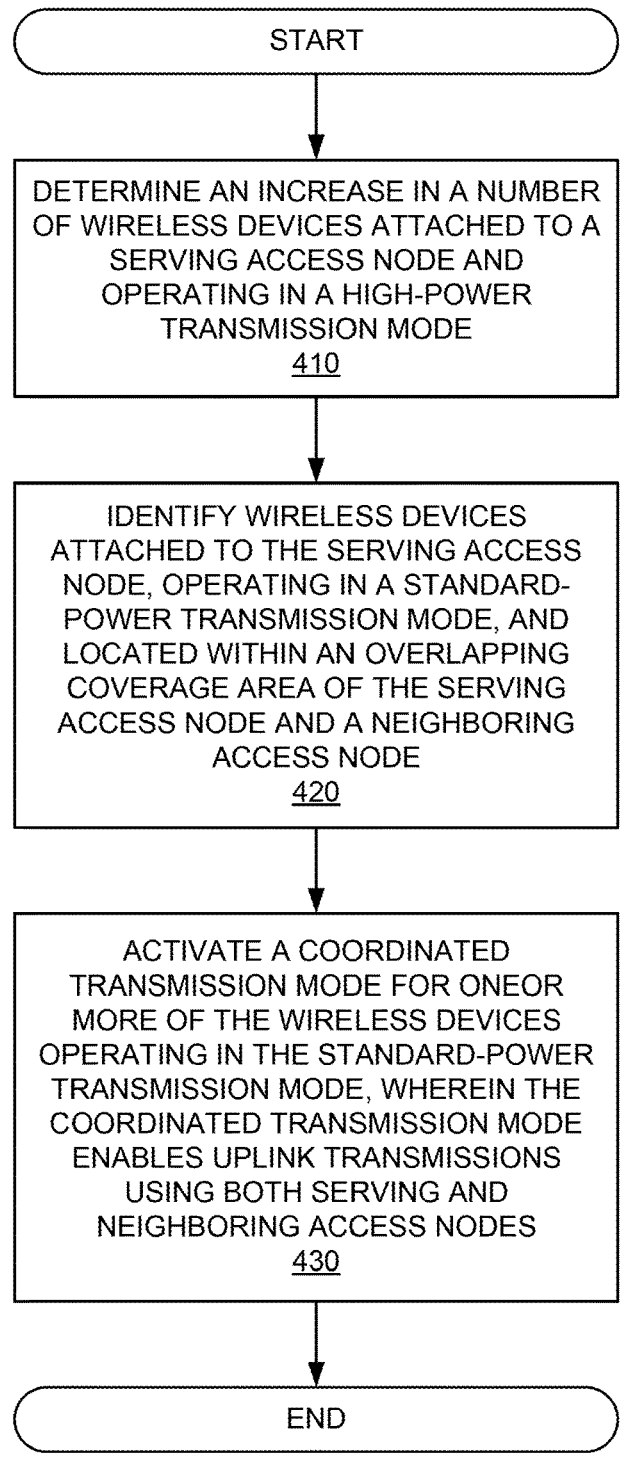
FIG. 4 depicts an exemplary method for minimizing interference in a wireless network.

FIG. 4 depicts an exemplary method for minimizing interference in a wireless network. The method of FIG. 4 may be implemented by an access node such as access node 110, 120, 210, by a controller node such as controller node 104, or by any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, an increase is determined in a number of wireless devices attached to a serving access node and operating in a high-powered transmission mode. For example, certain wireless devices may be assigned a higher power class, which provides a greater power headroom for uplink transmissions than other wireless devices that are assigned a lower power class, which provides a lower or default power headroom for uplink transmissions. Other devices using a standard or "default" transmission power, or a lower transmission power (i.e. standard-powered wireless devices), can be subject to interference caused by uplink transmissions from the high-powered wireless devices. This is especially true when both high-powered and standard-powered wireless devices are operating on the same frequency band or sub-band. Moreover, the interference is not necessarily an actual or measured interference, but may be a potential for interference based on a number of wireless devices operating in the high-powered operating mode (i.e., a "potential interference"). Thus, an increase in the number of high-powered wireless devices may be associated with an increase in the potential interference.

At 420, a number wireless devices are identified which are operating in a standard-powered transmission mode and located within an overlapping coverage area of the serving access node and a neighboring access node. The one or more standard-powered wireless devices may be determined to be within a signaling range of the serving access node and the one or more neighboring access nodes. Then, at 430, a coordinated transmission mode is activated for one or more of the standard-powered wireless devices identified in step 420. The coordinated transmission mode enables the one or more standard-powered wireless devices to transmit uplink data via a combination of a serving access node and one or more neighboring access nodes. For example, the coordinate transmission mode may comprise a coordinated multipoint (CoMP) transmission mode. Step 420 may be performed to enable step 430. For example, only those standard-powered wireless devices that are located an overlapping coverage area shared by the serving access node and at least one neighboring access node may be activated with the coordinated transmission mode. Utilizing antennas of multiple access nodes, which are necessarily at different locations, forms a virtual antenna array. Signals received from a standard-powered wireless device are combined and processed to produce a final output signal. Thus, signals that are very low in strength, or masked by interference can be received with fewer errors, thereby reducing the potential impact of interference in the wireless network.

Figure 5A:
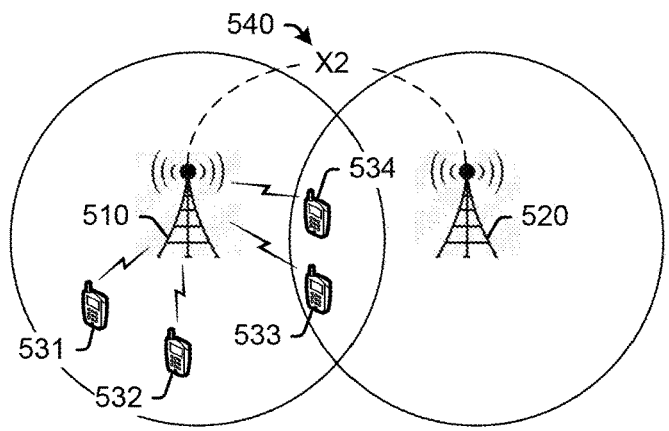
FIGS. 5A-5C depict an exemplary system for minimizing interference in a wireless network.
Figure 5B:
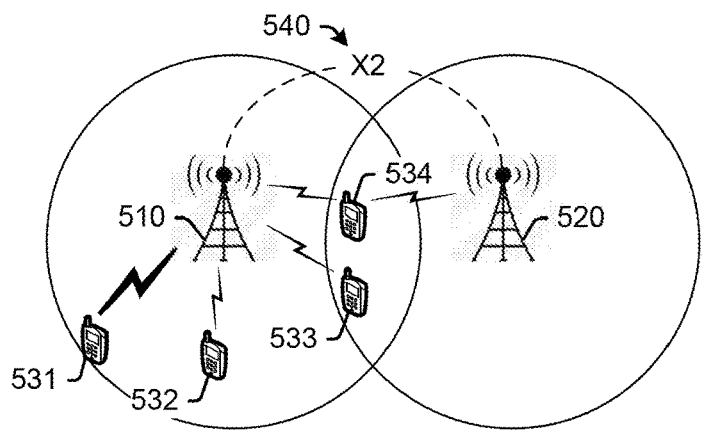
Figure 5C:
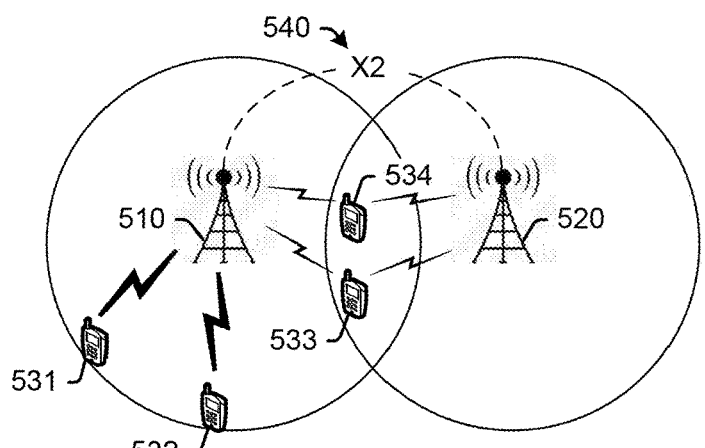

FIGS. 5A-5C depict an exemplary system for minimizing interference in a wireless network based on the operations performed in FIG. 4. The system in FIGS. 5A-5C depicts a plurality of wireless devices 531, 532, 533, 534 attached to a serving access node 510 and capable of the high-power transmission mode and/or the coordinated transmission mode. More specifically, each of wireless devices 531, 532, 533, 534 may be capable of one or both of the high-power transmission mode and the coordinated transmission mode. Access nodes 510 and 520 may be considered equivalent to access nodes 110, 120 in system 100, and are illustrated as being in direct communication with each other over a communication link 540, such as an X2 communication link. Wireless devices 531-534 may generally be considered equivalent to wireless devices 131-134 in system 100. Other network elements may be present to facilitate communication but are omitted for clarity, such as controllers, gateways, and physical and/or wireless data links for carrying data among the various network elements.

With reference to FIG. 5A, each of wireless devices 531-534 is illustrated as being in communication with access node 510 using a standard (or low) transmission power. With reference to FIG. 5B, wireless device 531 is illustrated as being closer to a cell edge of access node 510, and operating in a high-powered transmission mode. The power for uplink transmissions from wireless device 531 may be increased to effectively increase a range of the coverage area of access node 510. For example, wireless device 531 may be assigned a transmit power class that allows a higher transmit power than other wireless devices. Further, it will be appreciated by those having ordinary skill in the art that high-powered transmissions from wireless device 531 can cause interference to wireless devices 532, 533, and 534 that are operating using a standard transmission power for uplink transmissions on the same frequency band or sub-band as wireless device 531.

Thus, upon determining an increase in the number of high-powered wireless devices (in this case, from 0 to 1), any interference or potential thereof may be minimized by activating a coordinated transmission mode for one of standard-powered wireless devices 533, 534. For example, upon determining that wireless device 531 is operating in a high-powered transmission mode, wireless device 534 may be configured to operate in the coordinated transmission mode. The coordinated transmission mode enables wireless device 534 to transmit uplink data via a combination of access node 510 and neighboring access node 520. More specifically, utilizing antennas of each of access nodes 510 and 520, which are necessarily at different locations, a virtual antenna array is formed. Signals received from wireless device 534 by both access nodes 510 and 520 are combined and processed to produce a final output signal, which enables signals that are very low in strength, or masked by interference, to be received with fewer errors, thereby reducing the interference on at least wireless device 534. Moreover, prior to enabling the coordinated transmission mode for wireless device 534, wireless device 534 may be determined to be within a signaling range of both access nodes 510 and 520. In other words, only those standard-powered wireless devices that are located in the overlap region, such as wireless devices 533 and 534, may be activated with the coordinated transmission mode.

With reference to FIG. 5C, the same operations are performed with respect to wireless devices 532 and 533. In other words, it is determined that wireless device 532 is determined to be utilizing the high-powered transmission mode, and wireless device 533 is instructed to activate the coordinated transmission mode. For example, wireless device 532 is illustrated as being closer to the cell edge and, therefore, may be assigned a higher power class, such as power class 1. Consequentially, wireless device 533 is configured to operate in the coordinated transmission mode because it is within the overlap region of both coverage areas.

Figure 6:
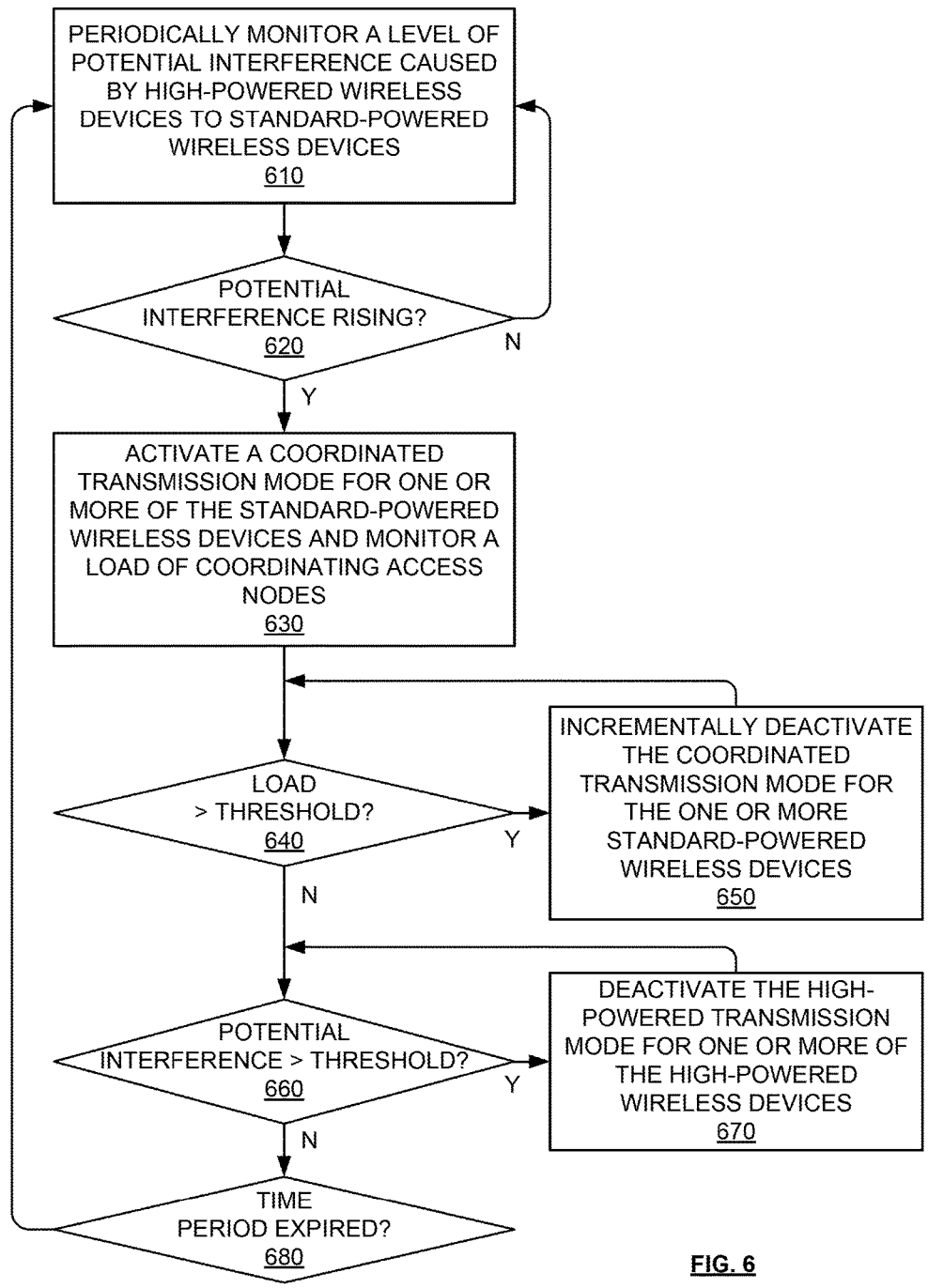
FIG. 6 depicts another exemplary method for minimizing interference in a wireless network.

As described herein, the increase in the number of wireless devices operating in the coordinated transmission mode may be associated with a congestion level of transmissions between access nodes, and dynamic adjustment of the number of wireless devices configured to utilize the coordinated transmission mode can performed to maintain the congestion level to within a threshold congestion level. Further, these operations may be performed until it is determined that the potential interference itself meets or exceeds a threshold, until which the high-powered transmission mode is deactivated. These operations are depicted in the exemplary embodiment of FIG. 6. The method of FIG. 6 may be implemented by an access node such as access node 110, 120, 210, by a controller node such as controller node 104, or by any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610 and 620, a level of potential interference is monitored. The potential interference may be caused by transmissions from wireless device operating in a high-powered transmission mode to wireless devices operating in a standard-powered transmission mode on the same frequency band or sub-band. Such an increase may be determined based on monitoring of a number of wireless devices attached to a serving access node and operating in a high-powered transmission mode. For example, certain wireless devices may be assigned a higher power class, which provides a greater power headroom for uplink transmissions than other wireless devices that are assigned a lower power class, which provides a lower or default power headroom for uplink transmissions. Thus, an increase in the number of high-powered wireless devices may be associated with an increase in the potential interference. The potential interference level is monitored periodically, such as at frame intervals, or a time range every few seconds or minutes, as configured by the network operator.

If the potential interference level rises, then at 630 a coordinated transmission mode is activated for one or more of the standard-powered wireless devices. The coordinated transmission mode enables the one or more standard-powered wireless devices to transmit uplink data via a combination of a serving access node and one or more neighboring access nodes. For example, the coordinate transmission mode may comprise a coordinated multipoint (CoMP) transmission mode. In an embodiment, only those standard-powered wireless devices that are located an overlapping coverage area shared by the serving access node and at least one neighboring access node may be activated with the coordinated transmission mode. Operation 630 further includes monitoring a load of the coordinating access nodes (i.e. the serving access node and the at least one neighboring access node). For example, the coordinated transmission mode results in increased signaling between access nodes receiving the uplink transmissions from the standard-powered wireless devices. The signaling may be performed using a communication link between the access nodes such as, for instance, an X2 link. Increased signaling can result in increased traffic on the X2 link, and can further be indicative of a congestion or potential for congestion. Thus, monitoring the load may include monitoring an actual traffic of the X2 link, or may be based on (or associated with) a number of wireless devices operating in the coordinated transmission mode between the access nodes.

At 640, the congestion level is compared with a threshold to determine adjustment of the number of standard-powered wireless devices that utilize the coordinated transmission mode. In an embodiment, the threshold congestion level comprises a threshold number of wireless devices operating in the coordinated transmission mode. In another embodiment, the threshold (i.e. the maximum number of standard-powered wireless devices activated with the coordinated transmission mode) may be based on a combination of the measured traffic load and the number of standard-powered wireless devices that are located within range of access nodes capable of coordinating uplink transmissions. In either case, if the congestion level is greater than the threshold, then at 650 the congestion may be mitigated by deactivating the coordinated transmission mode for one or more of the number of wireless devices, and looping back to comparison 640 until the congestion level is within the threshold congestion level. Alternatively or in addition, it may be determined that the congestion level is within the threshold congestion level, and the coordinated transmission mode may be activated for one or more of the number of wireless devices until the congestion level meets the threshold congestion level. In other words, the coordinated transmission mode may be incrementally activated or deactivated for each standard-powered wireless device, to maintain the congestion level to within a threshold congestion level.

Further, at 660, the potential interference level is compared with a threshold interference level. If the threshold interference level is met or exceeded, then at 670 the high-powered transmission mode is deactivated for one or more of the high-powered wireless devices. The determination that the potential interference level exceeds a threshold interference level can be based on the number of high-powered wireless devices exceeding a threshold number of high-powered wireless devices. Deactivating the high-powered transmission mode for the high-powered wireless devices may be performed separately or in conjunction with the activation of the coordinated transmission mode for the standard-powered wireless devices. For example, if the potential interference level continues to rise after a maximum number of standard-powered wireless devices is activated with the coordinated transmission mode at 650, then the high-powered transmission mode is deactivated for one or more of the high-powered wireless devices at 670. Deactivating the high-powered transmission mode can include deactivating the high-powered transmission mode for all high-powered wireless devices attached to the serving access node. This may be performed by broadcasting a reduced maximum power from the serving access node. For example, a system information message indicating a reduced maximum power level (such as a default maximum power level) may be broadcast from the serving access node to all wireless devices attached thereto, resulting in high-powered wireless devices having to lower their transmission power level to the default maximum power level.

Upon determining at 660 that the potential interference stops exceeding the threshold interference, and upon expiration of a timer at 680, the method loops back to monitoring the interference caused by high-powered transmissions at 610. In exemplary embodiments, the high-powered transmission mode may be activated at some point in time during or after the timer, or during monitoring 610. For example, the high-powered transmission mode may be the default transmission mode for the high-powered wireless devices, such that monitoring steps 610 and 620 are performed continuously to determine any increase in the number of high-powered wireless devices.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access nodes 110, 120, controller node 104, and/or network 101.

Figure 7:
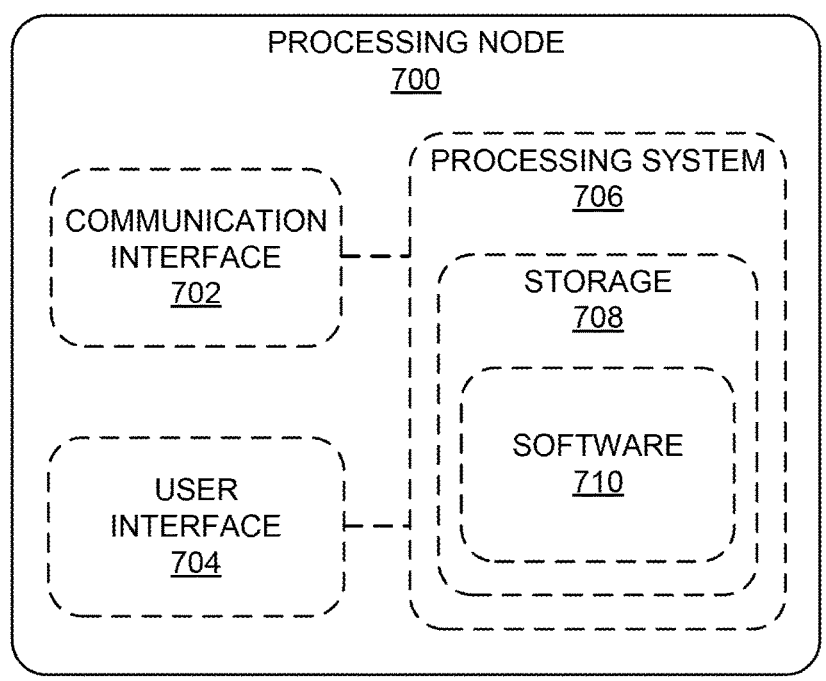
FIG. 7 depicts an exemplary processing node for minimizing interference in a wireless network.

FIG. 7 depicts an exemplary processing node for controlling a transmit power of wireless devices in a wireless network. Processing node 700 comprises a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a module for performing transmit power control operations described herein. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for minimizing interference in a wireless network, the method comprising:
   determining an increase in a number of high-powered wireless devices attached to a serving access node, wherein the increase in the number of high-powered wireless devices causes a corresponding increase in a potential interference to standard-powered wireless devices attached to the serving access node; and
   activating a coordinated transmission mode for one or more standard-powered wireless devices responsive to the determining the increase in the number of high-powered wireless devices.

2. The method of claim 1, further comprising determining that the one or more standard-powered wireless devices are within an overlapping coverage area shared by the serving access node and at least one neighboring access node, wherein the coordinated transmission mode enables the one or more standard-powered wireless devices to transmit uplink data via a combination of the serving access node and the at least one neighboring access node.

3. The method of claim 2, further comprising:
   monitoring a congestion level of the serving access node and the at least one neighboring access node; and
   incrementally activating and deactivating the coordinated transmission more mode for the one or more standard-powered wireless devices to maintain the congestion level to within a threshold congestion level.

4. The method of claim 1, further comprising:
   determining that the potential interference exceeds a threshold interference; and
   deactivating a high-powered transmission mode for at least one of the one or more high-powered wireless devices.

5. The method of claim 4, wherein the determination that the potential interference exceeds a threshold interference is based on the number of high-powered wireless devices exceeding a threshold number of high-powered wireless devices.

6. The method of claim 4, wherein deactivating the high-powered transmission mode for said at least one of the one or more high-powered wireless devices comprises deactivating the high-powered transmission mode for all high-powered wireless devices attached to the serving access node.

7. The method of claim 6, wherein deactivating the high-powered transmission mode comprises broadcasting a reduced maximum power from the serving access node.

8. The method of claim 4, further comprising:
   determining that the potential interference stops exceeding the threshold interference; and
   activating the high-powered transmission mode for at least one of the one or more high-powered wireless devices.

9. A system for minimizing interference in a wireless network, the system comprising:
   a processing node; and
   a processor coupled to the processing node, the processor for configuring the processing node to perform operations comprising:
   identifying a plurality of high-powered wireless devices and a plurality of standard-powered wireless devices attached to a serving access node, wherein uplink transmissions from the plurality of high-powered wireless devices causes a potential interference to one or more of the plurality of standard-powered wireless devices;
   determining that a number of high-powered wireless devices meets a threshold number of high-powered wireless devices; and
   deactivating a high-powered transmission mode for one or more of the plurality of high-powered wireless devices responsive to the determining that the number of high-powered wireless devices meets the threshold.

10. The system of claim 9, wherein deactivating the high-powered transmission mode for the one or more high-powered wireless devices comprises broadcasting a reduced maximum power from the serving access node.

11. The system of claim 9, wherein the operations further comprise:
    determining that the number of high-powered wireless devices does not meets the threshold number of high-powered wireless devices; and
    activating the high-powered transmission mode.

12. The system of claim 9, wherein the operations further comprise activating a coordinated transmission mode for the one or more standard-powered wireless devices based on the determining that the number of high-powered wireless devices meets the threshold, wherein the coordinated transmission mode enables the one or more standard-powered wireless devices to transmit uplink data via a combination of the serving access node and at least one neighboring access node.

13. The system of claim 12, wherein the operations further comprise monitoring a traffic level of a communication link between the serving access node and the at least one neighboring access node for congestion.

14. The system of claim 13, wherein the operations further comprise:
    determining that the traffic level meets a threshold traffic level; and
    incrementally deactivating the coordinated transmission mode for each of the one or more standard powered wireless devices until the traffic level does not meet the threshold traffic level.

15. The system of claim 13, wherein the operations further comprise:
    determining that the traffic level does not meet a threshold traffic level; and
    incrementally activating the coordinated transmission mode for each of the one or more standard powered wireless devices until the traffic level meets the threshold traffic level.

16. A processing node for minimizing interference in a wireless network, the processing node being configured to perform operations comprising:
    determining an increase in a number of high-powered wireless devices attached to a serving access node, wherein the increase in the number of high-powered wireless devices causes a corresponding increase in a potential interference to standard-powered wireless devices attached to the serving access node; and
    activating a coordinated transmission mode for one or more standard-powered wireless devices responsive to the determining the increase in the number of high-powered wireless devices.

17. The processing node of claim 16, wherein the operations further comprise determining that the one or more standard-powered wireless devices are within an overlapping coverage area shared by the serving access node and at least one neighboring access node, wherein the coordinated transmission mode enables the one or more standard-powered wireless devices to transmit uplink data via a combination of the serving access node and the at least one neighboring access node.

18. The processing node of claim 17, wherein the operations further comprise:
    monitoring a congestion level of the serving access node and the at least one neighboring access node; and
    incrementally activating and deactivating the coordinated transmission mode for the one or more standard-powered wireless devices to maintain the congestion level to within a threshold congestion level.

19. The processing node of claim 16, wherein the operations further comprise:
    determining that the potential interference exceeds a threshold interference; and
    deactivating a high-powered transmission mode for at least one of the one or more high-powered wireless devices.

20. The processing node of claim 19, wherein the determination that the potential interference exceeds a threshold interference is based on the number of high-powered wireless devices exceeding a threshold number of high-powered wireless devices.

* * * * *